June 6, 1950  J. R. MOORE  2,510,129

PULSE GENERATING CIRCUIT

Filed Nov. 28, 1942

INVENTOR
JAMES R. MOORE

BY William D. Hall
ATTORNEY

Patented June 6, 1950

2,510,129

UNITED STATES PATENT OFFICE 2,510,129

PULSE GENERATING CIRCUIT

James R. Moore, Rumson, N. J., assignor to the United States of America as represented by the Secretary of War Application November 28, 1942, Serial No. 467,265

1 Claim. (Cl. 250—27)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to pulse generating circuits.

There are a number of fields in which it is necessary to provide electrical energy in the form of sharp pulses, that is, pulses of very short duration, with intervals of relatively long duration therebetween. Pulse-echo systems for locating and ranging are an important example.

One known method of obtaining pulse-energy involves the use of a gas tube. However, this method has a number of disadvantages. One is that it is difficult to hold the pulse energy constant in phase. Another is that a gas tube circuit is slow to start. Still another is that it is affected by external temperature, and may fail in extreme summer or winter weather.

The primary object of my invention is to overcome the foregoing disadvantages, and to provide a pulse generating apparatus not requiring the use of a gas tube. Still another object is to obtain unidirectional pulse energy derived from alternating current.

To the accomplishment of the foregoing general objects, and such other more specific objects as hereinafter appear, my invention consists in the apparatus elements and their relation one to another as are hereinafter described and sought to be claimed in the following specification. The specification is accompanied by a drawing in which Figure 1 is a wiring diagram for apparatus embodying features of my invention;

Figure 1:
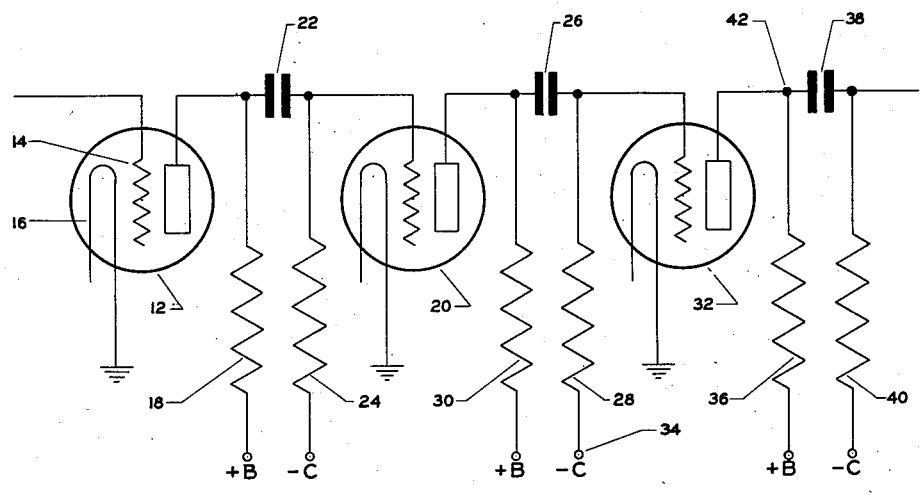
Figure 2:
Figure 2 illustrates a sine wave input.
Figure 3:
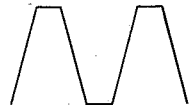
Figures 3 and 4 show how the sine wave is deformed into a square wave.

Referring to the drawing, alternating current having an approximate sine wave form, as shown in Figure 2, is applied across the input circuit of tube 12. The particular circuit used between the control electrode 14 and the cathode 16 of tube 12 is not illustrated, as it is not a novel part of the present invention. The tube 12 is overdriven, that is, it is operated beyond the saturation point of the characteristic curve on the positive grid swing, and beyond cutoff on the negative grid swing. The output current is therefore limited, and the potential appearing across the plate resistor 18 is flattened at the top and bottom. Thus the sine wave shown in Figure 2 is deformed in the direction of a square wave, as shown in Figure 3.

The output of tube 12 is applied to a second overdriven amplifier tube 20. In the specific circuit here illustrated, the coupling is a resistance coupling utilizing a blocking condenser 22 and a biasing resistor 24. Tube 20 is overdriven, and its output assumes a substantially square wave form, as shown in Figure 4.

Figure 4:
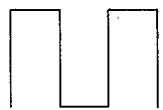
Figure 5:
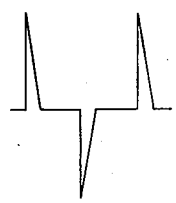
Figure 5 illustrates a bidirectional pulse obtained from the square wave.

In order the convert the square wave of Figure 4 to the pulse wave of Figure 5, I employ an R. C. circuit having a time constant which is very small compared to the period of the sine wave and square wave. Specifically, the R. C. circuit comprises a condenser 26 and a resistor 28 connected in series with each other and in shunt (with respect to radio frequency) and with the plate resistor 30 of tube 20. The condenser 26 being small is quickly charged to maximum potential. Current flows through the resistor 28 only during the instant of charging (or discharging) of condenser 26; consequently, potential is developed across the resistor 28 of the R. C. circuit for only an instant during each half cycle of the square wave. In other words, the potential developed across resistor 28 is a bidirectional pulse of the character illustrated in Figure 5.

This bidirectional pulse may be rectified, if unidirectional pulses are wanted. In the present case the pulse potential is applied to the input circuit of a tube 32. A negative biasing potential is supplied at terminal 34, said potential being sufficiently high to cause the tube 32 to operate as a class C amplifier. The operation is such that there is no plate current except when a positive pulse is applied to the grid. The negative pulses merely drive the grid more negative, and no plate current flows. In consequence, only intermittent unidirectional pulses of current flow through the anode impedance 36.

Figure 6:
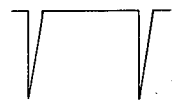
Figure 6 shows a unidirectional pulse produced from the bidirectional pulse.

This output may be utilized or further applied in any desired manner. In the present case, the pulse is fed to another tube through a resistance coupling made up of a blocking condenser 38 and a bias resistor 40. In such case, it is the change in potential at the point 42 or across the resistor 36 that is utilized. This is indicated in Figure 6, which shows the negative pulses or sharp drops in potential accompanying the pulse current flow through the output impedance 36.

It is believed that the construction and operation of my improved pulse generating circuit, as well as the advantages thereof, will be apparent from the foregoing detailed description.

It will be understood that if square wave energy is available, the right-hand portion only of the circuit need be employed, that is, the overdriven amplifier tubes 12 and 20 may be omitted, and the square wave potential may be applied directly to the R. C. circuit 26, 28. It will also be understood that if bidirectional pulse energy is desired, the tube 32 may be omitted, or may be differently biased so that both positive and negative pulses will manifest themselves in the output circuit of the tube.

It will therefore be apparent that while I have shown and described my invention in a preferred form, changes and modifications may be made in the apparatus disclosed, without departing from the spirit of the invention as sought to be defined in the following claim:

I claim:

Apparatus for changing a sine wave to short unidirectional pulses, said apparatus comprising resistance coupled first and second tubes, said tubes being overdriven by the sine wave in order to produce a square wave, each of said tubes being driven to saturation and to cutoff by the positive and negative portions, respectively, of the wave applied thereto, the output circuit of the second overdriven tube comprising a plate resistor and an R. C. circuit in shunt relation thereto, a third tube having its control electrode circuit connected across the resistor of the aforesaid R. C. circuit, the time constant of said R. C. circuit being very short relative to the period of the alternating current and thereby producing sharp bidirectional pulses, said third tube being normally biased to cutoff, whereby only alternate pulses appear in the output circuit of said third tube.

JAMES R. MOORE.

REFERENCES CITED

The following references are of record in the file of this patent:

UNITED STATES PATENTS

| Number | Name | Date |
|---|---|---|
| 2,086,918 | Luck | July 13, 1937 |
| 2,095,261 | McCaa | Oct. 12, 1937 |
| 2,132,655 | Smith | Oct. 11, 1938 |
| 2,166,688 | Kell | July 18, 1939 |
| 2,188,611 | Norton | Jan. 30, 1940 |
| 2,226,459 | Bingley | Dec. 24, 1940 |
| 2,320,476 | Schrader et al. | June 1, 1943 |
| 2,324,797 | Norton | July 20, 1943 |
| 2,340,429 | Rankin | Feb. 1, 1944 |